UNITED STATES PATENT OFFICE.

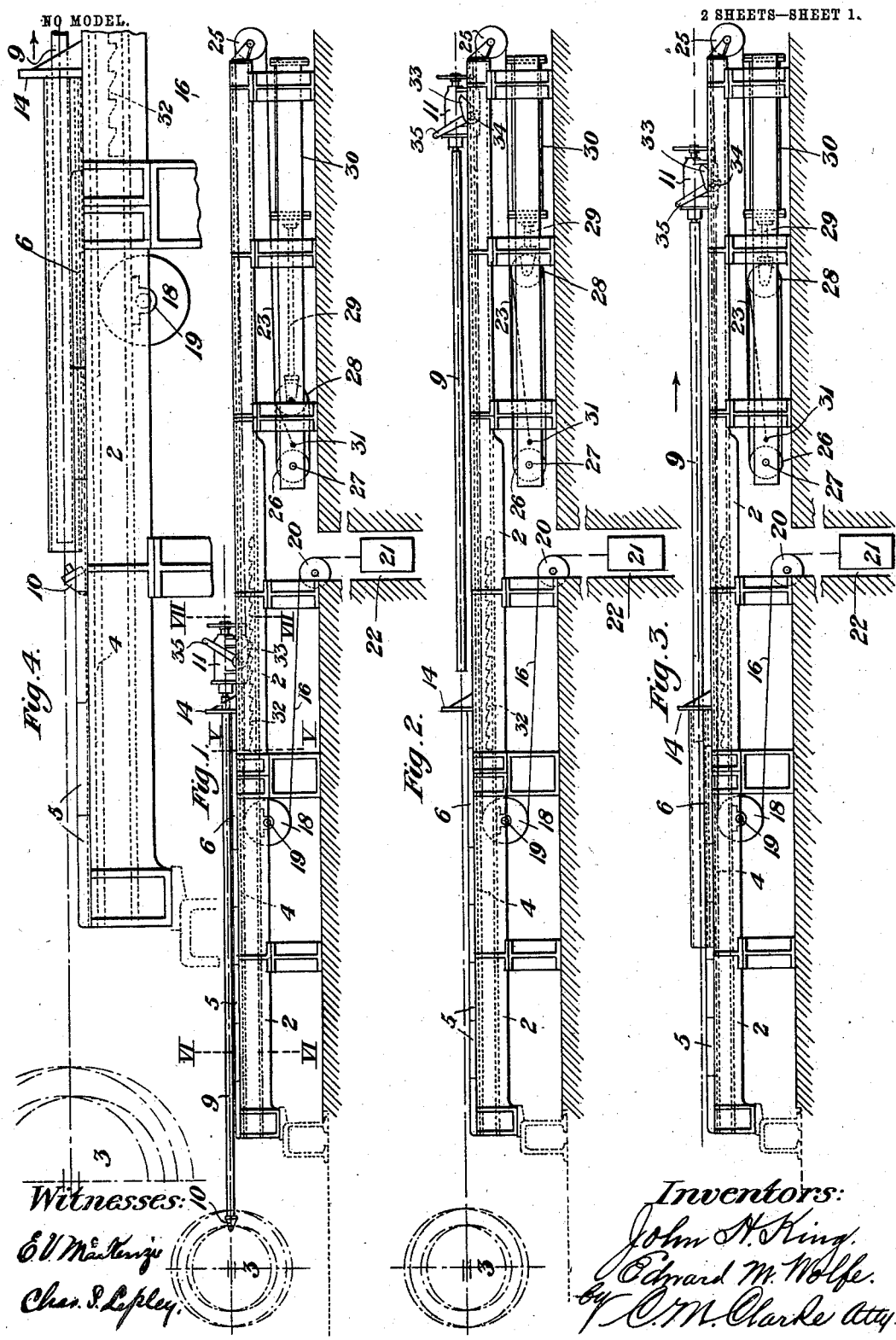

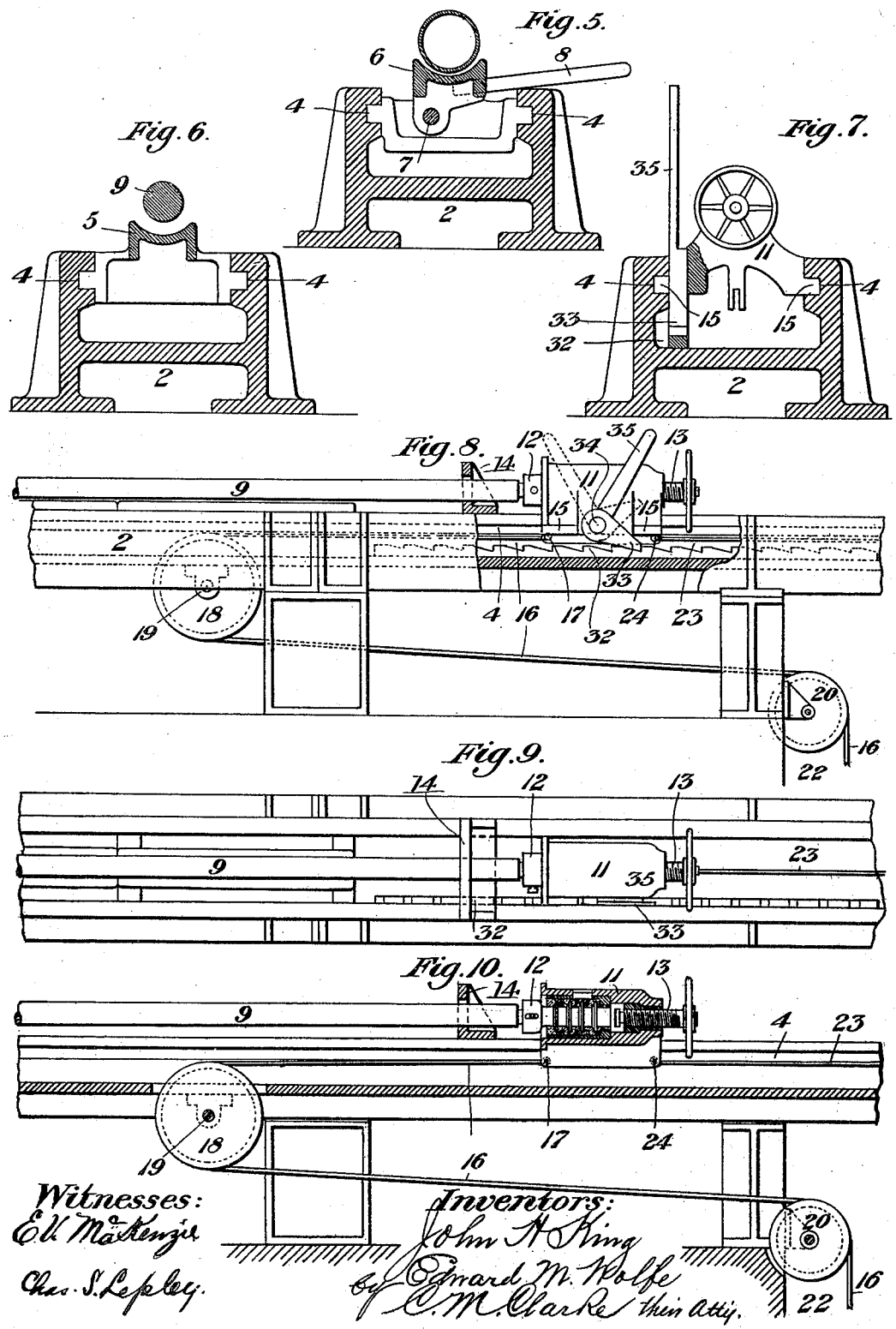

JOHN H. KING AND EDWARD M. WOLFE, OF BEAVERFALLS, PENNSYLVANIA, ASSIGNORS OF ONE-THIRD TO GEORGE H. BLAXTER, OF PITTSBURG, PENNSYLVANIA.

APPARATUS FOR MANUFACTURING SEAMLESS TUBING.

SPECIFICATION forming part of Letters Patent No. 719,231, dated January 27, 1903.

Application filed December 26, 1901. Serial No. 87,362. (No model.)

*To all whom it may concern:*

Be it known that we, JOHN H. KING and EDWARD M. WOLFE, citizens of the United States, residing at Beaverfalls, in the county of Beaver and State of Pennsylvania, have invented certain new and useful Improvements in Apparatus for Manufacturing Seamless Tubing, of which the following is a specification, reference being had therein to the accompanying drawings, forming part of this specification, in which—

Figure 1 is a view in side elevation of our improved apparatus for manufacturing tubes, showing the bar advanced. Fig. 2 is a similar view showing the bar withdrawn. Fig. 3 is a similar view showing the operation of stripping the tube from the bar. Fig. 4 is a partial similar view, on an enlarged scale, illustrating the detachment of the point. Fig. 5 is a cross-sectional view on the line V V of Fig. 1. Fig. 6 is a similar view on the line VI VI of Fig. 1. Fig. 7 is a similar view on the line VII VII of Fig. 1. Fig. 8 is a partial view in side elevation, partly broken away, showing the cable connections for operating the thrust-bearing. Fig. 9 is a plan view of Fig. 8. Fig. 10 is a longitudinal sectional view through the thrust-bearing, illustrating its construction and also showing the connection with the actuating-cables.

Our invention relates to the manufacture of seamless tubes; and it consists in the means for advancing and withdrawing the bar carrying the piercing-point over which the tube is formed, means for stripping the finished tube, disengaging it from the table, and for the adjustment and location of the bar, together with other details of construction, as shall be more fully hereinafter set forth.

Referring to the drawings, 2 is a longitudinal frame or table situate in advance of the disks 3 or other suitable blank-forming mechanism, such table or frame being provided upon its inner faces with slideways 4, extending, preferably, from one end to the other of the table. In such slideways are mounted the permanent troughs 5, adapted to receive the tube after the bar is withdrawn, while beyond such fixed trough is a tipping section or trough 6, pivotally mounted upon shaft-bearing 7 and provided with a laterally-extending bar 8, by which the trough and tube may be thrown to one side and the tube discharged from the table upon skids or other suitable supporting apparatus.

9 is the usual pressure-bar, upon the outer end of which is placed the piercing-point 10, the bar being connected at its rear end, as shown, with the traveling adjustable thrust-bearing 11. The connection of the bar with the thrust-bearing is best illustrated in Fig. 10, the rear end of the bar being slotted, as shown, and adapted to move freely with relation to its connections and to bear backwardly through the intervening rotating spindle 12 against adjusting-screw 13, by which the bar may be set forward to the exact position desired with relation to the working faces of the disks.

Immediately in advance of the thrust-bearing is an abutment 14, through an opening in which the bar passes, but which abutment, however, limits the back travel of the tube and strips it off the bar during its back progress, as clearly illustrated in Fig. 3.

The thrust-bearing 11 is mounted, by means of slides 15, in the slideways 4, in which it is free to travel forward and back, and such travel is imparted to it through cables connected to the center frame of the thrust-bearing, as is best seen in Figs. 8 and 10. The cable 16 is attached at 17, passes forwardly around a grooved wheel 18, mounted in bearing 19 upon the under portion of the table, the cable then passing back over a grooved sheave-wheel 20, also pivotally mounted in suitable bearings, the other end of the cable being attached to a counterweight 21, adapted to rise and fall in a pit 22 and at all times maintaining a tension and forward pull upon the thrust-bearing. Backward travel of the thrust-bearing is caused by means of cable 23, similarly connected at 24 to the thrust-bearing, the cable passing backwardly around sheave 25, mounted at the outer end of the frame, then forwardly around a similar wheel 26, pivotally mounted in bearings 27 underneath the table, then around a traveling pulley-wheel 28, carried upon the outer end of a piston-rod 29 of a fluid-actuated cylinder 30.

Several of such wheels 26 and 28 may be provided, and the cable may be passed one or more times around such wheels 26 and 28 and then secured to any suitable point in the frame, as at 31. By passing the cable as many times as desired around these wheels it will be seen that the leverage upon the thrust-bearing may be multiplied two or more times, according to the work in view.

The cylinder 30 is preferably double-acting to assist the counterweight and may be operated by a valve located at any convenient point to admit pressure to cause outward travel of the sheave-wheels 28, as in Fig. 2, and similar movement of the thrust-bearing 11, the return movement being accomplished by means of the weight 21 and cable 16. Mounted upon the sides of the table, on one side in any convenient position, is a rack-bar provided with teeth 32, in which the pawl 33 will engage at any desired position, so as to lock the thrust-bearing in order to maintain the point 10 against pressure of the oncoming blank. The pawl 33 is pivotally mounted to the side of the thrust-bearing at 34, and connected with it is an upwardly-extending lever-arm 35, by which it may be thrown out of engagement, and when so thrown out of engagement, as indicated in dotted lines in Fig. 8, the weight of the lever will hold the pawl out of engagement with the teeth of the rack-bar to permit backward travel of the thrust-bearing. The range of adjustment of the screw 13 being somewhat greater than the pitch of teeth 32, it will be seen that the bar can be set independent of the pitch of the teeth and that having been so arranged it is only necessary to bring the thrust-bearing forward to its proper position and then throw the pawl 33 into engagement and supply sufficient back pressure to it in order to maintain the point in proper position for work. The tube having been formed, the pawl is thrown up, as indicated in Figs. 2 and 3, pressure is supplied to cylinder 30, and the bar is withdrawn to its full limit, during which backward movement the tube 36 comes into contact with the abutment 14, first stripping off the ball 10, as indicated in Fig. 4, and then stripping the tube by further backward travel until it is entirely free, when it may be discharged from the table by lifting the lever 8 and tipping the trough-section 6. The point 10 having been replaced, the bar may then be advanced by releasing pressure from the cylinder and applying pressure to the other side of the piston, thus assisting the counterweight, the outer end of the bar being supported in the trough, when the operation may be again repeated.

The whole construction is positive, simple, and compact. The operation is rendered easy and dispenses with manual labor very largely, while rendering the manipulation of the bar and tube comparatively easy and insuring the positive alinement and adjustment of the various parts independent of any especial skill.

The advantages of this construction will be appreciated by all those familiar with the operation of making seamless tubing, and the mechanism may be adapted to the manufacture of any size of tubes which may be made from a hollow billet.

Various changes and modifications may be made by the skilled mechanic in the design, proportions, or other details, according to special conditions, without departing from the invention, since we do not desire to be limited to the exact construction shown and described, but to include all such as within the scope of the following claims.

What we claim is—

1. In combination with reducing-rolls, a table provided with a longitudinally-movable thrust-bearing provided with means for locking it against pressure of the mandrel at varying positions on the table, a mandrel connected with the thrust-bearing provided with a piercing-point, means for adjusting the mandrel independent of the thrust-bearing, and means for imparting forward and back travel to the thrust-bearing.

2. In combination with reducing-rolls, a table provided with longitudinal supporting-troughs, a thrust-bearing adapted to travel forward and back upon the table provided with means for locking it against pressure of the mandrel at varying positions on the table, a mandrel connected with the thrust-bearing provided with a piercing-point, means for adjusting the mandrel independent of the thrust-bearing, and means for imparting forward and back travel to the thrust-bearing.

3. In combination with reducing-rolls, a table provided with longitudinal supporting-troughs, a thrust-bearing adapted to travel forward and back upon the table provided with means for locking it against pressure of the mandrel at varying positions on the table, a mandrel connected with the thrust-bearing provided with a piercing-point, means for adjusting the mandrel independent of the thrust-bearing, flexible connections attached to the thrust-bearing passing in opposite directions around guiding-sheaves and connected with means for transmitting movement to the thrust-bearing in either direction.

4. In combination with reducing-rolls, a table provided with longitudinal supporting-troughs, a thrust-bearing adapted to travel forward and back upon the table provided with means for locking it against pressure of the mandrel at varying positions on the table, a mandrel connected with the thrust-bearing provided with a piercing-point, means for adjusting the mandrel independent of the thrust-bearing, flexible connections attached to the thrust-bearing passing forwardly around a guiding-sheave and provided with a terminal counterweight, a flexible connection attached to the thrust-bearing passing backwardly and around guiding-sheaves, and a fluid-actuated element adapted to exert pulling pressure upon said connection.

5. In combination with reducing-rolls, a table provided with longitudinal supporting-troughs, a thrust-bearing adapted to travel forward and back upon the table, a mandrel mounted therein provided with a terminal point, means for transmitting movement to the thrust-bearing in either direction, a locking-pawl mounted in the thrust-bearing adapted to engage teeth in the table, and means for adjusting the mandrel with relation to the thrust-bearing.

6. A table provided with longitudinal slideways, rigid and tipping troughs mounted therein, a thrust-bearing slidingly mounted upon the table, a mandrel connected therewith and provided with a terminal point, a limiting-abutment for the tube and means for imparting forward and back movement to the thrust-bearing.

7. A table provided with longitudinal slideways, rigid and tipping troughs mounted therein, a thrust-bearing slidingly mounted upon the table, a mandrel connected therewith and provided with a terminal point, a limiting-abutment for the tube, and means for imparting forward and back movement to the thrust-bearing, and means for locking the thrust-bearing in the table.

8. A table provided with longitudinal slideways, rigid and tipping troughs, mounted therein, a slidingly-mounted thrust-bearing provided with a connected mandrel having a terminal point, means for adjusting the bar, means for locking the thrust-bearing upon the table, and means for imparting movement to it in either direction.

In testimony whereof we affix our signatures in presence of two witnesses.

JOHN H. KING.
EDWARD M. WOLFE.

Witnesses:
SUSIE W. ROUZER,
WILLIAM DICKS.